United States Patent [19]

Eichel

[11] Patent Number: 4,910,786
[45] Date of Patent: Mar. 20, 1990

[54] METHOD OF DETECTING INTENSITY EDGE PATHS

[76] Inventor: Paul H. Eichel, 11416 Nassau Dr., NE., Albuquerque, N. Mex. 87111

[21] Appl. No.: 782,227

[22] Filed: Sep. 30, 1985

[51] Int. Cl.$^4$ ............................................. G06K 9/48
[52] U.S. Cl. ...................................... 382/22; 382/27; 382/54
[58] Field of Search ...................... 382/54, 53, 41, 22, 382/27, 34, 37, 38, 39; 358/22, 182, 183, 282, 284; 378/901

[56] References Cited

U.S. PATENT DOCUMENTS 3,588,823  6/1971  Chow .................................... 382/37
4,499,598  2/1985  Chitteneni ............................ 382/22

OTHER PUBLICATIONS

"Decision Function Method for Boundary Detection", Y. P. Chien and K. S. Fu, 12/18/73.
"An Application of Heuristic Search Methods to Edge and Contour Detection," Martelli, Commun. ACM, vol. 19, pp. 73-83, 1976.
"The Representation and Matching of Pictorial Structures," Fischler & Elschlager, IEEE Trnas. Computer, vol. C-22, pp. 67-92, Jan. 1973.
"Convolutional Codes III: Sequential Decoding," Forney, Jr., Inf. Control., vol. 25, pp. 267-297, Jul. 1974.
"Computer Evaluation of Dynamic Left Ventricular Volume from Serial Angiograms," J. Modestino et al, Proc. Computers in Cardiology, St. Louis, MO, pp. 211-218, Oct. 7-9, 1976.
"Fast Sequential Decoding Algorithm Using a Stack," Julinek, IBM J. Res. and Dev., vol. 13, pp. 675-685, Nov. 1969.
"A Heuristic Discussion of Probabilistic Decoding," R. Fano, IEEE Trans. Inf. Theory, vol. IT-9, pp. 64-74, Apr. 1963.
"The Contour Extraction Problem with Biomedical Applications," Ashkar & Modestino, CGUO, vol. 7, pp. 331-355, 1978.
"Maximum Likelihood Estimation of Markov-Process Blob Boundaries in Noisy Images," D. Cooper, IEEE Trans. PAMI, vol. PAMI-1, pp. 372-384, Oct. 1979.
"Variable-Lendth Codes and the Fano Metric," Massey, IEEE Trans. Inf. Theory, vol. IT-18, No. 1, pp. 196-198, Jan. 1972.
"Notes on Maximum-Entropy Processing," Edward and Pitelson, IEEE Trans. Inf. Theory, pp. 232-233, Mar. 1973.
Information and Reliable Communication, R. Gallager, pp. 63-69, pp. 273-278, pp. 309-313, 1968.
"Finding Edges and Lines in Images," J. Canny, MIT Al-TR-720 Jun. 1983.

Primary Examiner—Leo H. Boudreau
Assistant Examiner—Jose L. Couso
Attorney, Agent, or Firm—Killworth, Gottman, Hagan & Schaeff

[57] ABSTRACT

A method of detecting intensity edge paths in an image produced by a technique which is selected from the group consisting of X-ray, CAT scan, nuclear magnetic resonance, photographic, video recording, and photo-detection techniques, includes an initial step of determining the gradient magnitude and direction of the image in an array or lattice of node points using a Gaussian weighted gradient operator. A root node having a high probability of being on an edge path is then selected by selecting a node having a high gradient magnitude. The metric for each adjacent node to the root node is then calculated. The various metrics are stored for each such adjacent node. Using the adjacent node having the highest metric, the metrics for other nodes adjacent thereto are calculated. These steps are repeated and the edge path having the highest metric is thereby determined.

4 Claims, 3 Drawing Sheets

METHOD OF DETECTING INTENSITY EDGE PATHS

BACKGROUND OF THE INVENTION

The present invention relates to image processing and, more particularly, to the detection of edges, lines, and other linear features in two-dimensional discrete images utilizing a sequential detection tehnique.

Edge detection represents one of the first processing steps in a great many computer vision and image processing tasks. Reflecting this importance, the literature devoted to the problem is enormous. One need only consult a recent bibliography such a A. Rosenfeld, "Picture processing: 1983", CVGIP, vol. 26, pp. 347-393, June 1984, to gain an appreciation of this fact. Many tasks in computer vision, pattern recognition, and image processing depend upon the successful execution of this step.

Consider two-dimensional digital images. By digital it is meant that the image is discrete in the spatial domain, e.g. the image intensity function is not continuous over the two dimensions but defined only on an array of points, and the intensity levels at these points are furthermore quantized into a fixed, finite number of levels.

The underlying assumption in this and many other treatments of edge detection is that edges of interest in real scenes such as object boundaries, etc. are represented in an image as a discontinuity in intensity. Therefore the task of edge detection becomes one of identifying intensity discontinuities. The human visual system and perception are such that discontinuities are not the only intensity functions that are perceived as "edges." Other possibilities include discontinuities in the first derivative of the intensity function (ramp edges), texture edges, and color changes. While these features are important in some contexts, and are in fact sufficiently similar to the problem of intensity discontinuities to perform their detection by sequential techniques, this discussion is confined solely to the first problem. It should be noted, however, that sequential algorithms attempt to exploit only the connectivity of edges and are largely independent of the specific edge operator used.

Given that the goal is to identify intesnity discontinuities, two general classes of techniques have emerged to address this problem: gradient-type operators and parametric models. Gradient-type operators, which for the purposes of this discussion will include first and second order spatial derivative operators, are discrete spatial filters whose magnitude responses have various high pass characteristics. In particular, they attempt to perform the discrete equivalent of a two-dimensional gradient, a direction derivative operator, or a second order derivative operator. The idea is to emphasize those regions of an image where the intensity function changes rapidly with distance and suppress the area with little change in intensity. These operators may also provide information regarding the direction of the gradient, or in the case of directional operators, the component of the gradient in a given direction.

Generally speaking, gradient-type operators are implemented with one of a variety of window functions. This is due to the fact that real edges are of finite extent and therefore the operator must have finite support, i.e. be windowed. If the window function is rectangular, the spectral response of the operator will exhibit the familiar Gibbs phenomenon of Fourier theory. The large gain at high spatial frequencies exacerbates the effects of noise on the output. As in other signal processing applications, the answer to this problem is to employ smoother window functions such as Hamming, Hanning, or Guassian windows.

Parametric models view the image intensity fucntion as a surface and this surface is projected onto a set of basis functions. From this modeled surface, edge parameters such as slope position and direction are estimated. A question of importance is the completeness of the basis function set, as the parameters can be estimated only from the projection of the actual image onto the space spanned by that set. For the purposes of this discussion we will include in this class the moment-type operators. These methods attempt to detect intensity discontinuities from the moments of the distribution of intensity values in a window.

Practically all edge detection schemes proposed to date in the above classes involve a classification step that utilizes one or more thresholds. Having obtained estimates of the gradient magnitude of direction or edge parameters from a fitted model, some mechanism must be employed to decide whether or not those quantities indicate the presence of an intensity edge at the location in question. This classification step is performed via a decision threshold. Even the second order derivative approach cannot avoid this step. Although zero crossings of the two-dimensional Laplacian nominally indicate intensity edges, even small amounts of noise contribute to a very high density of noise induced zero crossing contours. Therefore, practical implementations must apply a threshold to the slope of the second derivative perpendicular to the zero crossing.

This thresholding process may be accomplished in various ways. Earlier techniques established a global threshold on the basis of the histogram of operator outputs or the Receiver Operating Characteristic (ROC) of the operator. More recent methods select the threshold in an adaptive manner based on local image content or on entropy ideas.

The question of threshold selection raises two fundamental and related problems with all of these edge detection techniques. The first of these is known as streaking. This phenomenon results from the fact that real images are highly non-homogeneous and edge parameters may change substantially even along the same edge contour. Regardless of the sophistication of the threshold selection process, it is possible and in fact common that due to noise, the operator output is at times above and other times below the decision threshold along the length of a given edge contour. This results in an edge map in which edges that are in reality a single connected contour are only partially detected. The broken segments or streaks are a major concern since many processing tasks that follow edge detection require well connected or even closed edge contours. On the other hand, if the thresholds are set so liberally that the edges of interest are detected with good connectivity, then many false detections and multiple responses on strong edges occur. This is the classical detection theory trade-off between probability of detection and probability of false alarm. Not only is it difficult to decide on a threshold, it is fundamentally impossible to simultaneously achieve a high detection probability and low false alarm rate as the signal-to-noise ratio decreases.

A second and related problem is the performance at low signal-to-noise ratio. Since operators attempt to make a decision based only on local information, as the noise power increases, this decision becomes increasingly more difficult to make. The solution generally adopted is to increase the number of observations that contribute to the decision, i.e. make the operator larger. This improves the output signal-to-noise ratio of the operator but only at the expense of spatial resolution. The way to circumvent that problem is to employ a set of directional operators: long skinny operators that pick up their additional observations along an edge rather than out in every direction. This may only be taken so far, however, because the more directional the operator, the larger the requisite set of such operators. Additional complications arise from the fact that edges in real images tend not to run straight for very long. This mandates the inclusion of curved operators which further compounds the job of choosing an operator set.

Classical detection theory states that the way to improve performance at low singal-to-noise ratio is to increase the number of observations contributing to the decision. As we have just seen, simply increasing the size of the edge operator is moderately successful in this regard but at the expense of spatial resolution. In addition, the desirable "edge information" generally lies in the vicinity of the edge itself, so picking up observations far from the edge contributes little to the decision process. Using directional operators improves the output-signal-to-noise ratio while maintaining good spatial resolution, but this approach soom becomes unwieldy as the number of such operators increases geometrically with their length.

One possible way out of this dilemma is to assemble observations along the edge contour. Observations are made in a very long and narrow path that is deformed to lie along the edge, including curves, corners, and straight segments. Since the set of all possible such paths is enormous, the paths are instead grown in an iterative fashion beginning at a point that is known to lie on the edge. This is the basic philosophy behind sequential edge detection. A searching algorithm attempts to hypothesize possible edge topologies or paths. These paths are extended iteratively, with the current most probable path extended by one observation at each iteration.

For this technique to succeed in finding edges, a means of comparing all paths hypothesized so far has to be provided. This comparison is accomplished by associating with each path a statistic called a path metric which reflects the given path's probablity of coinciding with the edge contour. Therefore, only the most likely paths are extended by the searching algorithm. In this way an exhaustive search is avoided.

Sequential edge detection has several potential advantages over the techniques discussed earlier. First is offers the possibility of better performance (higher detection probability, lower false alarm probability) at low image signal-to-noise ratio than the local operators, since it obtains many more observations along the edge. For the same reason, the problem of choosing a detection threshold is alleviated: it is much easier to decide "edge" or "no edge" based on many observations than on a few. Secondly, by the very nature of the searching process, the detected edge paths exhibit complete connectivity. Therefore, streaking can be eliminated. Although it is not obvious from this discussion, two subtle advantages to a sequential approach also arise. One is that it allows an analytical treatment of the probability that segments of detected edge contours are in error rather than merely points. The second is that it provides a framework in which the correlation between observations in an image can be exploited to aid in the detection process. The principle disadvantage of a sequential approach is one of computational speed. Actually, on a sequential processor, such algorithms tend to be more efficient than parallel algorithms. But the latter has the potential of dramatically improved speed on special purpose parallel architectures.

We will return to discuss all of the foregoing ideas in more detail later, but first we shall review preceding efforts in the literature related to the detection of edges in images by sequential methods. Early work by Fishler and Elschlager, "The representation and matching of pictorial structures," *I.E.E.E. Trans. Computers,* vol. C-22, pp. 67–92, January 1973, while not precisely a sequential edge detection technique, nevertheless represents one of the earliest efforts to recognize the fact that improved performance at low signal-to-noise ratio can be accomplished by considering edge contours as a whole rather than local points. In their method, hypotheses consist of "embedded" edge contours. For each such embedded contour, an associated cost is calculated. A dynamic programming technique is used to search the (enormous) space representing all possible contours in an effort to find that with the lowest associated cost. In a similar fashion, R. Griffith, "Automatic boundary and feature extraction for the estimation of left ventrical volume in man from serial selective angiocardiograms," D. Eng. Thesis, Rensselaer Polytechnic Institute, August 1973, has also used a dynamic programming technique.

Both of these methods have two common problems. Dynamic programming tecnniques attempt to find the best hypothesis in a search. Although they are more efficient than an exhaustive search, the amount of computation for even modest image sizes is still very large. Secondly, the associated cost of an embedded contour is an ad-hoc quantity requiring a considerable amount of tailoring to specific images.

In an effort to reduce the amount of computation involved with dynamic programming methods, Chien and Fu, "A decision function method for boundary detection," *CGIP,* vol. 3, pp. 125–104, 1974, have proposed the use of what is known as depth-first tree searching. They explicitly formulate the edge detection problem as a search through a rooted tree. Their branch "costs," however, are highly specialized to the type of image under consideration and employ a great deal of a-priori information. In a similar fashion, Martelli, "An Application of Heuristic Search Methods to Edge and Contour Detection," *Common. ACM,* Vol. 19, pp. 73–83, 1976, formulates the problem as a graph searh and uses the A* algorithm, N. Nilsson, *Problem-Solving Methods in Artificial Intelligence,* McGraw-Hill, 1971, to perform the search. This algorithm is quite similar to the Z-J or stack algorithm described below. Again, Martelli's cost function is ad-hoc and peculiar to the type of image under consideration.

Extending the work of Martelli, D. Cooper, "Maximum likelihood estimation of markov-process blob boundaries in noisy images." *IEEE Trans. PAMI,* vol. PAMI-1, pp. 372–384, October 1979, has also used the A* search algorithm. He has attempted to take some of the arbitrariness out of the cost function by basing that function on a likelihood statistic. He models hypothesized edge contours as a Markov process. The image is modeled as consisting of two region types, "background" and "object," separated by the edge contour.

The two types are assumed to be of different but constant intensity. The cost statistic is then the joint likelihood of the particular hypothesized edge contour and the image pixel values, given the assumption that all pixels inside the contour belong to the object at one gray level value and all outside belong to the background at the other gray level value. Note that for each hypothesized edge contour, the statistic must be calculated over the entire image.

This method represents one improvement over its forerunners but exhibits several serious drawbacks. On the plus side, the cost function is at least statistical in nature and so has a better theoretical basis than the heuristic functions discussed above. This allows for some performance analysis. Also, the Markov edge contour model captures an important characteristic of real edges, as discussed below. On the other hand, the assumption of only two image pixel types, "object" and "background," independent and of constant gray level values, is highly unrealistic. In practically any real image of interest, pixel gray level values within and outside of objects may vary considerably due to lighting inhomogeneities, shadows, and object inhomogeneities. Pixels are almost never stochastically independent. Furthermore, such a problem statement is only useful for finding bounding contours of objects and is useless for finding internal edges, and interesting edges, all of which may be important to subsequent processing.

Ashkar and Modestino in "The contour extraction problem with biomedical applications," *CGIP*, vol. 7, pp. 331-355, 1978, disclose a technique similar to Chien and Fu above, starting by formulating the edge detection problem as a tree search. They make the important step of applying search to the output image of an edge operator rather than to the original image. This helps overcome some of the shortcomings of Cooper's approach. A Z-J or stack algorithm, discussed below, is used to perform the search. This method represents a fully mature example of sequential detection with additive brach costs or metrics and a truly sequential search. However, its metric suffers from two problems: it is again very ad-hoc in nature, with components that depend on experimentally determined parameters and look-up tables, and it requires a prototype contour. This latter is a contour provided by some a-priori knowledge base that helps to guide the search toward some preconceived estimate of the final edge map. This represents rather high quality a-priori information and, while possible appropriate to certain narrow classes of problems, is a severe limitation to the method's generality. This metric formulation furthermore limits any analytical treatment of the method.

It is seen, therefore, that there is a need for a method which formalizes the use of sequential searching as an alternative to the use of local thresholds as a classification criteria on the output of edge operators. Since it is a processing step following the application of an edge operator, it is largely independent of which specific operator is used. The method should allow the integration of many observations along an edge contour to enter into the classification process in order to improve the performance at low signal-to-noise ratio, ease the difficulty in choosing a threshold, and eliminate the incidence of streaking in the resulting edge map.

SUMMARY OF THE INVENTION

These needs are met by a method of detecting an edge path in an image produced by a technique which is selected from the group consisting of X-ray, CAT scan, nuclear magnetic resonance, photographic, video recording, and photodetection techniques comprising the steps of:

a. determining a plurality of pixel values, each such pixel value associated with one of a lattice of nodes, b. selecting a root node having a high probability of being located on an edge path by selecting a node with a high pixel value, c. calculating a metric for adjacent nodes to the root node, d. storing the metrics for each such adjacent node, e. using the adjacent node having the highest metric, calculating the metrics for other nodes adjacent thereto, and f. repeating steps d. and e. until the edge path having the highest metric is determined.

The method may further comprise the steps of finding additional root nodes and performing the steps b.-f. with respect thereto. The steps f. may comprise the step of continuing until an edge path closes on itself, or crosses a previously determined edge path, or reaches the edge of the lattice.

The pixel values may represent the gradient of the gray level at the nodes in the image. The metric may be independent of path length.

The pixel values may be gradient magnitudes and directions determined by using a Gaussian weighted gradient operator.

The step of calculating the metric $\Gamma(m^i, f^i)$ comprises the step of calculating $$\Gamma(m,f) = \sum_{i=1}^{n} \left[ \ln \frac{p_1(f_{r_1})}{p_0(f_{r_1})} + \ln Pr(s_i|s_{i-1}) \right]$$

Accordingly, it is an object of the present invention to provide a method of detecting intensity edge paths in an image, such image being produced by techniques such as X-ray, CAT scan, nuclear magnetic resonance, photographic, video recording, and photodetection techniques, in which a root node having high probability of lying on an edge path is initially selected and various adjacent nodes are assessed sequentially to determine the most likely edge path; to provide such a method in which a metric is calculated for each node based upon the pixel value of the node and the topology of the path by which the node was reached, such metric being an indication of the likelihood that the node lies on the edge path; and to provide a method in which the pixel values are representative of the gradient magnitude and direction of the image.

Other objects and advantages of the invention will be apparent from the following description, the accompanying drawings and the appended claims.

DETAILED DESCRIPTION OF THE PREFERRED EMBODIMENT

Figure 1:
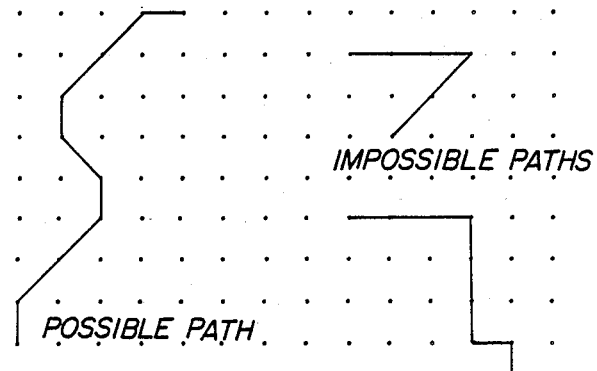
FIG. 1 is an representation of a plurality of nodes arranged in a lattic, illustrating possible and impossible paths.

The present invention relates to a method, termed Sequential Edge Linking, which is used to enhance images consisting of pixel arrays derived from X-ray photographs, and various other data sources. Finding linear features in an image is a post-processing task to follow the application of an emphasis operator. We consider such an operator to be any mathematical operator that, when applied to a digital image, produces an estimate of the magnitude and direction of the desired linear feature at every point in the image.

Some pre-processing (i.e. using an operator) is prudent. Although it might be possible to perform a sequential search directly on the raw image, this results in the need to introduce additional parameters. Use of a preprocessing operator decomposes the feature extraction task into two parts: emphasis and detection. The operator serves to emphasize the feature in which we are interested. The sequential searching algorithm then attempts to perform the detection process based on this emphasized information. This allows the detection algorithm to be independent of the feature. For example, to perform intensity edge detection, the preprocessing operator is designed to emphasize intensity discontinuities in the image. Likewise, the operator may be designed to emphasize lines, roof edges, texture edges, or color edges. In any case, its output is expected to be a function of the magnitude and/or the direction of that particular feature at every point in the image.

In the case of intensity edges, the preprocessing operator generally attempts to estimate the magnitude and direction of the local intensity gradient. However it usually also employs spatial low-pass filtering to avoid unacceptably high probability of false detection in situations with poor signal-to-noise ratio. By incorporating such filtering in the edge operator, which is applied over the entire image, one may take advantage of certain computational efficiencies.

We will assume for now that gradient magnitude and direction information represents the input to our system. Our goal is to determine connected lines representing intensity edges in the original image while not responding to spurious effects of noise, etc. We would like to achieve as much positional accuracy as possible, but due to the searching technique, subpixel accuracy cannot be obtained.

A crucial observation is that it is not desirable to quantize this gradient information any more coarsely than necessary. We certainly do not want to threshold this data (quantize to one bit) globally, locally, adaptively, with hysteresis, or whatever. Nor do we wish to non-maximum suppress it. The experience of detection theory, coding theory, and related disciplines states that coarse quantization of noisy, correlated observations independently of one another may be expedient or acceptable where the signal-to-noise ratio is high, but leads to poor performance when the signal quality deteriorates.

Instead of making such hard decisions (thresholding) right away, experience dictates one "integrate" the soft information over many observations before concluding on a decision. This "integration" takes a variety of forms depending on the application. For example, radar problems utilize sequential detection theory; all decoding algorithms in coding theory base decision on blocks or long sequences of received data; examples of correlational detection abound. Sequential edge linking is one manner in which such integration may be performed in the context of image edge detection.

The image processing literature has not entirely ignored this fact. Non-isotropic, highly directional edge operators make explicit use of this idea. J. Canny, "Finding edges and lines in images," *MIT AI-TR-720*, June 1983, has calculated the actual performance improvement to be derived from long operators stretched in the direction of an edge. These suffer from two related disadvantages: they are typically limited to short, straight segments or a small number of curved segments, and they are computationally prohibitive as their size increases (since they must be convolved in all orientations over all points of an image). Even with certain restrictions imposed, the number of possible configurations grows exponentially with the number of pixels in the operator. Certainly, decision based on hundreds of pixels, accomplished according to the present invention, are unthinkable by these methods.

Relaxation-based methods do make use of soft edge magnitude and direction information as well as the interaction between neighboring pixels and thus reportably accounts for their high performance in certain situations. The trouble with relaxation lies with its convergence properties. In particular, in many situations convergence of the algorithm is not even guaranteed or the solution is not known to be unique. No performance bounds can be determined or estimated. In short, one must report to a "try and see" approach. Furthermore, the nature of the pixel interdependence specified in the algorithm cannot take advantage of any knowledge of the true correlation statistics.

Finally there are the sequential searching techniques. Various investigators have attempted to employ sequential tree or graph searching algorithms in this context. Ashkar and Modestino, above, and Cooper, above, seem to have come the closest to SEL. With the former, the metric used to guide the search is purely ad-hoc and so cannot benefit from any analysis aimed at determining its behavior or probability of success. More seriously, however, their technique makes explicit use of a "training contour" to guide the search. This represents very high quality a-priori information. It is noted that in certain specific circumstances such information may indeed be available, but it greatly reduces the generality of the method. The second technique is quite different from SEL and, as noted earlier, suffers from quite restricting assumptions concerning the mean gray level of pixels and their independence. While the results are generally good on artificial images where these assumptions are explicitly met, their performance on real images is yet to be demonstrated. It can be said, however, that the path searching technique of both of these approaches is very similar to that of SEL, as is the philosophy for doing so.

Having obtained the gradient magnitude and direction information from an edge operator (plus spatial filter), it seems tempting to suggest a maximum likelihood search. To do this, one might hypothesize all possible edge paths of say n pixels in length, calculate their respective a-priori likelihoods, assuming some distribution on the gradient levels, and pick the largest. However, the exponential growth of the candidate configurations with n dooms this approach, regardless of the maximum likelihood algorithm used. The situation is analogous to the problem of decoding convolutional codes in coding theory. One may use ML techniques such as dynamic programming as long as the constraint length is small ($<9$ or 10). Beyond this, the exponential growth of computation and memory requirements with constraint length make the algorithm too unwieldy.

The solution to the decoding problem with large constraint lengths, sequential loading, is the inspiration behind SEL. In both situations one does not attempt to explore all possible paths in the tree, picking the ML path, but rather one explores only a small subset of them with a high probability of including the correct one. This exploration is accomplished sequentially, extending only those paths which hold high promise of being the correct one.

This approach has several promising virtues. First, it can explore trees with large "constraint lengths" or memory very efficiently and at high speed. Sequential decoding of codes with constraint lengths of up to 50 and at speeds in excess of 10 Mb/s is not uncommon. Secondly, disregarding the problem noted in the next paragraph, the error performance is generally very good. Thirdly and perhaps most importantly the analytical machinery developed for the analysis of sequential decoding may be brought to bear, with a number of important modifications, on the edge detection problem. This allows important inferences to be drawn regarding performance bonds, probability of error events, etc.

On the negative side, such sequential algorithms suffer a variety of problems resulting from their variable computation time. As signal-to-noise ratio degenerates, the number of possible paths explored increases. In data transmission systems, this can lead to buffer overflow and burst errors. With image edge detection, this means only that processing time is delayed. Looked at another way, SEL can take advantage of good signal-to-noise ratio by exploring fewer paths. In any case, processing time is variable, depending on the quality of the edge information present.

One final note. By virtue of its path metric, SEL can provide subsequent processing tasks with quantitative information concerning the confidence in segments or whole edges. Other attributes such as length, curvature, direction, and an ordering of the constituent pixels are explicitly determined and immediately available to higher level tasks.

It is appropriate here to specify clearly the definitions of some terms which will be used below.

. 1. IMAGES, RANDOM FIELDS

For our purposes, the terms image or digital image will refer to a sample function of a two-dimensional discrete parameter random field. Sample functions of this random field consist of a rectangular array of numbers. These numbers can represent various quantities depending on the nature of the field. If the array is an image of a natural scene, the numbers may represent the gray level of intensity of light at that point of the scene. Alternatively, they may represent an estimate of the magnitude of the gradient of such gray levels or the direction of the gradient. Whatever their interpretation, these numbers, henceforth to be called pixel values, pixels, or observations are defined at points of a rectangular lattice. The points of the lattice are called nodes, their spacing is uniform and equal in both directions, and they are indexed by I X I where I is the set of integers.

For a given random field, we assume the existence of a probability space $(\Omega, A, P)$ and a measurable function, $f_{\vec{r}}(\omega); \omega \epsilon \Omega, \vec{r} \epsilon I^2$ defined on this space:

$$f_{\vec{r}}(\omega): \Omega \times I^2 \to F \subset R \tag{1}$$

Here, $\vec{r}=(r^1, r^2)$ is the pair of coordinates of a node in the array, and $f_{\vec{r}}(\omega)$ is the pixel value at that node, and F is some countable subset of the set of real numbers.

Due to the rectangular nature of the lattice, each node has a unique set of eight neighbors. The node at coordinates $(r^1, r^2)$ has the neighbor set:

$(r^1+1, r^2)$, $(r^1, r^2+1)$, $(r^1-1, r^2)$, $(r^1, r^2-1)$, $(r^1-1, r^2-1)$, $(r^1-1, r^2+1)$, $(r^1+1, r^2-1)$, $(r^1+1, r^2+1)$. Any ordered set of nodes for which all adjacent pairs are neighbors will be called connected. An ordered pair of neighbors also uniquely defines a direction. Eight such directions are therefore possible.

2. PATHS

A path will be defined as a connected set of nodes with the following property: for any subset of three nodes in the ordered set, the direction defined by the first two nodes and by the second two nodes differ by $\pi/4$ or less. Thus, if one were to draw line segments between nodes of a path, the resulting curve would contain no changes of direction greater than or equal to $\pi/2$ (see FIG. 1).

Paths may be denoted in one of two ways. The first is simply the ordered set of nodes comprising the path:

$$m=[(r_1^1, r_1^2), (r_2^1, r_2^2), \ldots (r_m^1, r_m^2)] \tag{2}$$

The second method is by specifying a start node and direction, and an ordered set of letters:

$$m=(r_0^1, r_0^2) \times \vec{d_0} \times [a_1, a_2, a_3, \ldots a_n] \tag{3}$$

where $(r_0^1, r_0^2)$ is the start node, $\vec{d_0}$ is the start direction, and $a_i$ are taken from an alphabet $A=[L, S, R]$. The letters of the alphabet stand for left, straight, and right, respectively. The coordinate of the nodes of the path may be obtained in a recursive fashion from the letters $a_i$. The first node is obtained from the start node by moving in the array in the direction $\vec{d_0}$. The direction to the second node is then obtained from $\vec{d_0}$ and $a_1$ (and so on) by the obvious rule:

$$\vec{d_1} = \begin{cases} \vec{d_0} + \frac{\pi}{4} & \text{if } a_1 = L \\ \vec{d_0} & \text{if } a_1 = S \\ \vec{d_0} - \frac{\pi}{4} & \text{if } a_1 = R \end{cases} \tag{4}$$

This process can likewise be reversed to obtain the list-of-letters description of a path from the list of node coordinates. Thus, either description uniquely specifies a given path and they are equivalent.

The second path description has been introduced in order to clarify the following model for paths. We will assume that paths may be modeled as a $k^{th}$ order Markov Chain. In the following discussion, we will focus on the letters $a_i$ of paths and take up the question of the start nodes and direction later.

Let us consider a discrete time stochastic process $S_i$, $i=0, 1, 2, 3, \ldots$;

$$S_i(\omega): \Omega \to \Sigma \tag{5}$$

The underlying space $\Omega$ is just the space of all possible state sequences:

$$\Omega=(s_0, s_1, s_2, \ldots) \tag{6}$$

and $\Sigma$ is the state space. When the process enters the state at i+1 from that at i, it outputs a letter $a_{i+1} \epsilon A=[L, S, R]$. The state of the system is defined to be the ordered sequence of the last k letters put out by the system:

$$s_i=(a_i, a_{i-1}, \ldots, a_{i-(k-1)}) \tag{7}$$

so that $\Sigma = A \times A \times \ldots \times A = A^k$. We will assume $s_0$ is fixed and known. The Markov assumption is then:

$$Pr(S_{i+1}=s_i, s_{i-1}, \ldots, s_0) = Pr(S_{i+1}=s_{i+1}|s_i) \tag{8}$$

or $$Pr(a_{i+1}|s_i, \ldots, s_0) = Pr(a_{i+1}|s_i) \tag{9}$$

from which it follows by the chain rule:

$$\begin{aligned} Pr(m) &= Pr(a_1, a_2, \ldots, a_n) \\ &= Pr(s_n | s_{n-1}) Pr(s_{n-1} | s_{n-2}) \ldots Pr(s_1 | s_0) \end{aligned} \tag{10}$$

This is our stochastic model for the path process. It bears a strong resemblance to that used in the article by D. Cooper, discussed above. By manipulation of the transition probabilities, $Pr(s_{i+1}|s_i)$, certain types of paths achieve higher probability of occurrence than do others. For example, the model may favor paths exhibiting long segments of straight transitions over those that meander incessantly with highly probably L to R and R to L transitions. Such a nonuniform distribution of transition probabilities may be experimentally verified for images.

3. PATH METRIC

The crucial concept in any sequential tree searching algorithm is that of a path metric. The algorithm's efficiency and chance of success lies in its ability at any point of execution to rank all the paths explored so far by a measure of their "quality". This measure is the path metric. The path branch metric of Ashkar and Modestino, discussed above, is an example, but it suffers from a lack of generality and is largely ad-hoc. A path branch metric has been derived according to the present invention which optimizes a joint probability criterion.

A concept of a branch metric for sequential tree searching was first introduced in the problem of sequential decoding of convolutional codes by R. M. Fano in "A hueristic discussion of probabilistic decoding," *IEEE Trans. Inf. Theory*, vol. IT-19, pp. 232-234, March 1973. That metric is probabilistic, reflecting the statistical nature of the underlying coding theory. The metric according to the present invention is also probabilistic. This is in part due to the models assumed for images and paths, but also because it allows a statistical treatment of the operation and performance of the algorithm.

Path metrics should exhibit certain desirable qualities. First, they should not be biased by path length. That is, the metric should not favor a long path over a short one just because of its length or vice versa. All paths need to be compared on the basis of their probability of being an edge path regardless of length. Second, they need to be efficient to compute. This is best served by a metric that is recursively computed: the metric of a path to a certain node is obtained from that to the preceding node by adding a "correction value" that depends only on the new node. This eliminates the necessity for calculating the metric anew over the nodes of a long path every time it is extended by a node. This is very important from the standpoint of efficiency and becomes an even more crucial requirement when the observations are correlated. Finally, the metric should exhibit the all-important "drift" characteristics. That is, it should tend to increase along true edge paths and decrease elsewhere. This is critical to ensure that a sequential searching alogrithm proceeds correctly.

The path metric will be defined for paths in a random field as defined previously. We will assume the following two measures on the random field. The first, $p_1(f_{\vec{r}}=y)$, is the probability the field value or observation at node $\vec{r}$ is y conditioned on the hypothesis, $H_1$, that that node is on an intensity edge in the original image:

$$\begin{aligned} p_1(f_{\vec{r}}=y) &= Pr(f_{\vec{r}}=y | H_1) \\ &= Pr(f_r=y | \vec{r} \text{ is on an edge}) \end{aligned} \tag{11}$$

The second is the probability of the observation conditioned on the null hypothesis, $H_0$, that the node is randomly positioned in the field with respect to intensity edges:

$$\begin{aligned} p_0(f_r=y) &= Pr(f_{\vec{r}}=y | H_0) \\ &= Pr(f_{\vec{r}}=y | r \text{ is a random node}) \end{aligned} \tag{12}$$

Note that, at this point, we are not even specifying what the random field, f, represents but merely assuming the existence of these two conditional measures on that field. It will later turn out that the field is a gradient magnitude or gradient direction field or a function of both.

For a given path, m, $$\begin{aligned} m &= [\vec{r}_1, \vec{r}_2, \ldots, \vec{r}_n] \\ &= \vec{r}_0 \times \vec{d}_0 \times [a_1, a_2, \ldots, a_n] \end{aligned} \tag{13}$$

we now define the likelihood ratio, l(f), of the path in the conventional manner as:

$$l(f) = \frac{p_1(f_{\vec{r}_1}, \ldots, f_{\vec{r}_n})}{p_0(f_{\vec{r}_1}, \ldots, f_{\vec{r}_n})} \tag{14}$$

This is implies the joint probability of the observations along the path conditioned on the $H_1$ hypothesis divided by the joint probability of those values conditioned on the $H_0$ hypothesis.

From Equation (10), we have the probability of the path m is:

$$Pr(m) = \prod_{i=1}^{n} Pr(s_i|s_{i-1}) \tag{15}$$

We are now in a position to define our path metric. For the given path m, the path metric $\Gamma(mf)$, will be defined as the logarithm of the product of the path probability and its likelihood ratio:

$$\Gamma(m,f) = \ln[Pr(m) \cdot l(f)] \tag{16}$$

If we make the very important assumption that the random variables of the field are stochastically independent, then the likelihood ratio becomes:

$$l(f) = \frac{p_1(\vec{f_1}) p_1(\vec{f_2}) \cdots p_1(\vec{f_n})}{p_0(\vec{f_1}) p_0(\vec{f_2}) \cdots p_0(\vec{f_n})} \quad (17)$$

and Equation (16) simplified to:

$$\Gamma(m,f) = \sum_{i=1}^{n} \left[ \ln \frac{p_1(\vec{f_i})}{p_0(\vec{f_i})} + \ln Pr(s_i|s_{i-1}) \right] \quad (18)$$

The above assumption, known as the statistical independence of the observations, is an important one. It allows the factorization of the joint probabilities of the likelihood ratio which in turn gives the path metric its recursive computational efficiency. Note that path m may be extended by a node and the new metric obtained from the old by merely adding a term:

$$\Gamma_{n+1} = \Gamma_a + \left[ \ln \frac{p_1(\vec{f}_{n+1})}{p_0(\vec{f}_{n+1})} + \ln Pr(s_{n+1}|s_n) \right] \quad (19)$$

The path metric of Equation (18) is a sum of branch terms each of which has two components. These components play different roles. The first is a likelihood ratio of the probability of observing the random variable $f_r$ under the hypothesis $H_1$ to the probability under the null hypothesis. This component therefore is a function of the data in the image. The second component is the branch transition probability and is a measure of the a-priori probability that the edge path proceeds in that direction, given the last k branch directions.

The stochastic nature and recursiveness of our path metric are clear. The fact that it possesses the correct "drift" characteristics will now be demonstrated. For this purpose, we will find the conditional mean of the statistic, $$\frac{\Gamma(m,f)}{n},$$

i.e. the path metric normalized by its length:

$$E\left\{ \frac{\gamma(m,f)}{n} \Big| H_1 \right\} = \quad (20)$$

$$E\left\{ \frac{1}{n} \sum_{j=1}^{n} \left[ \ln \frac{p_1(f_j)}{p_0(f_j)} + \ln Pr(a_j|a_{j-1}) \right] \Big| H_1 \right\}$$

Now since the path process is stochastically independent of the random field under the $H_1$ hypothesis, the right hand side becomes:

$$E\left\{ \frac{1}{n} \sum_{j=1}^{n} \left[ \ln \frac{p_1(f_j)}{p_0(f_j)} \right] \Big| H_1 \right\} + \quad (21)$$

$$E\left\{ \frac{1}{n} \sum_{j=1}^{n} [\ln Pr(a_j|a_{j-1})] \right\}$$

Considering the first term above, since the observations, $f_j$, are equidistributed, the expectation of the sum is equal to the sum of n identical expectations, so that:

$$E\left\{ \frac{1}{n} \sum_{j=1}^{n} \left[ \ln \frac{p_1(f_j)}{p_0(f_j)} \right] \Big| H_1 \right\} = E\left\{ \ln \frac{p_1(f)}{p_0(f)} \Big| H_1 \right\} \quad (22)$$

$$= \sum_{f} p_1(f) \ln \frac{p_1(f)}{p_0(f)}$$

by the definition of the $p_1$ measure. This last quantity is seen to be the Kullback's Information (S. Kullback, *Information Theory and Statistics*, Wiley, 1959) between the $p_1$ and $p_0$ measures, denoted $I(p_1|p_0)$.

The second term of Equation (21) can be rewritten using the chain rule as:

$$E\left\{ \frac{1}{n} \sum_{j=1}^{n} [\ln Pr(a_j|a_{j-1})] \right\} = -E\left\{ \frac{1}{n} \ln \frac{1}{Pr(s_n, s_{n-1}, \ldots, s_1)} \right\} \quad (23)$$

$$= -E\left\{ \frac{1}{n} \ln \frac{1}{Pr(a_n, a_{n-1}, \ldots, a_1)} \right\}$$

which is defined to be the entropy per letter of the Markov source, R. Gallager, *Information and Reliable Communication*, Wiley, 1968. In the limit as $n \to \infty$, this quantity can be shown to be equal to:

$$-H_\infty(S) = -\sum_{i=1}^{3^k} q(i) \sum_{l=1}^{3} Pr(a_l|s = i) \ln \frac{1}{Pr(a_l|s = i)} \quad (24)$$

where $q(i)$ is the time averaged state probability of state i:

$$q(i) = \lim_{n \to \infty} \frac{1}{n} \sum_{j=1}^{n} Pr(s_j = i) \quad (25)$$

Since all the states in the Markov Chain we have been considering are recurrent and in the same equivalence class, i.e. each state can be reached from any other in one or more transitions and there are no states outside this set, $q(i)$ is independent of the intitial state, $s_0$. Combining Equations (21) and (23), we therefore have the final result that:

$$\lim_{n \to \infty} E\left\{ \frac{\Gamma(m,f)}{n} \Big| H_1 \right\} = I(p_1|p_0) - H_\infty(S) \quad (26)$$

Likewise, under the $H_0$ hypothesis, the observations term becomes:

$$E\left\{\frac{1}{n}\sum_{j=1}^{n}\left[\ln\frac{p_1(f)}{p_0(f)}\right]\bigg|H_0\right\} = E\left\{\ln\frac{p_1(f)}{p_0(f)}\bigg|H_0\right\} \quad (27)$$

$$= \sum_f p_0(f)\ln\frac{p_1(f)}{p_0(f)}$$

$$= -I(p_0|p_1)$$

so that:

$$\lim_{n\to\infty} E\left\{\frac{\Gamma(m,f)}{n}\bigg|H_0\right\} = -I(p_1|p_0) - H_\infty(S) \quad (28)$$

We see that since both $I(\bullet|\bullet)$ and $H_\infty(S)$ are strictly non-negative, the expected value of the normalized metric conditioned on the hypothesis that the path is not an edge path is negative. When conditioned on the $H_1$ hypothesis, the normalized metric will be positive if:

$$I(p_1|p_0) > H_\infty(S) \quad (29)$$

Therefore, as long as Equation (29) is satisfied, the metric tends to grow with length if the path is truly an edge path and tends to decrease with length otherwise. This is the desired "drift" tendency that allows the searching algorithm to find the edges in the image. It is interesting to note that the difference between the statistics conditioned on the two hypotheses grows with n as:

$$E\left\{\frac{\Gamma(m,f)}{n}\bigg|H_1\right\} - E\left\{\frac{\Gamma(m,f)}{n}\bigg|H_0\right\} = I(p_1|p_0) - \quad (30)$$

$$I(p_0|p_1)$$

$$= J(p_0,p_1)$$

where $J(\bullet,\bullet)$ is Kullback's Divergence. This says that, on average, the difference between the rate at which the metric grows along a true edge path and the rate at which it decreases along a random path is equal to the Kullback's Divergence between the two measures $P_1$ and $p_0$. It may also be shown that this path metric is not biased by path length.

4. GRADIENT OPERATORS

As discussed above, the SEL algorithm is usually preceded by the application of a spatial gradient operator. The algorithm operates on the output of this operator rather than on the raw image itself.

The function of the gradient operator is twofold. First, as its name implies, it forms an estimate of the (discrete) spatial intensity gradient at every node of the field. This includes direction as well as magnitude estimates. The rationale for this is that intensity edges in images generally coincide with large gradient values. Gradient magnitude is a local measure of "edginess" at a node that is independent of the average or baseline intensity in the local region. This high pass (in spatial frequency response) nature is characteristic fo all gradient-type signal processors.

Due to the predominance of high (spatial) frequency noise in many images, this high pass response of a gradient operator does little to reduce the average noise power in the opertor output. Partly to increase the output signal-to-noise ratio and partly to provide a measure of control over the overall spatial frequency response of the operator, gradient operators often include some low pass spatial filtering as their second function. Again, the choice of filter functions is large, with many "optimum" filters having been derived for specific situations and criteria. Favorable results given may be obtained using a 2-D Gaussian filter. This choice was made for two reasons. The kernel of a 2-D Gaussian filter is separable, i.e. the 2-D convolution can be decomposed into two concatenated 1-D convolutions. This has a dramatic effect on increasing computational efficiency, especially for filters with large support. Secondly, the Gaussian has the unique property among the myriad possible filter functions of having a minimum product of bandwidth and spatial resolution. Thus it ofers an excellent compromise between noise rejection (narrow low-pass bandwidth) and edge position blurring (spatial resolution). In fact, it has shown in the prior art through a variational Calculus argument that the Gaussian is very nearly equal to the optimum filter shape for intensity step edges in images where the criteria of optimality are edge positional accuracy and output signal-to-noise ratio.

Edge direction information is also useful in detection algorithms. Gradient operators are vector operators and provide estimates of the local gradient direction as well as the magnitude. These two quantities can be combined to provide a directional gradient operator. If $\vec{n}$ is a unit vector in a certain direction, then:

$$\nabla I \cdot \vec{n} \quad (31)$$

is the gradient of the field I in the direction of n. It has been argued by various investigators, that directional operators provide better performance in the presence of noise than do isotropic operators.

When Gaussian filtering is included, a directional gradient operator takes the form:

$$(\nabla G * I) \cdot \vec{n} \quad (32)$$

where I is the original field (image), G is a 2-D Gaussian kernel, * denotes 2-D convolution, and $\vec{n}$ is a unit vector in the desired direction. In other words, this operator only considers the component of the gradient in the direction $\vec{n}$; the component of the gradient parallel to $\vec{n}$ is disregarded.

The quantity in Equation (32) can be determined at the nodes of hypothesized paths in the following manner. The gradient operator is first applied to the entire image, with the magnitude and direction information stored separately in two output fields. The magnitude field is given by:

$$M = |\nabla G * I| \quad (33)$$

and the direction field by:

$$\vec{D} = \frac{\nabla G * I}{|\nabla G * I|} \quad (34)$$

When a given node, r, is visited by the algorithm, the directional gradient at r can be found by:

$$f_r = (\vec{D_r} \cdot \vec{d_r}^\perp) M_r \quad (35)$$

where $\vec{d_r}^\perp$ is orthogonal to the path direction at $\vec{r}$ and $\bullet$ is a vector dot product. Since the path to $\vec{r}$ defines a certain direction $\vec{d_r}$, the normal to this direction, $\vec{d_r}^\perp$, is dotted into the gradient direction at $\vec{r}$ and this is multiplied by the gradient magnitude. Thus, $f_{\vec{r}}$ is precisely the directional gradient of Equation (32) at the node $\vec{r}$. Note that $f_{\vec{r}}$ is a function of the path direction at $\vec{r}$ as well as the gradient magnitude and direction.

It should be pointed out that Equation (32) gives only one possible f-field input to SEL. Many others could be used. For example, the input field could be just the gradient magnitude, $$f_{\vec{r}} = M_{\vec{r}} \qquad (36)$$

or it could be the output of the Sobel operator the $\nabla^2 G$ operator, compass gradient masks, or many of a large variety of mathematical operators. Equation (32) merely represents one possible input field that has been used. The path metric used by the SEL algorithm requires scalar values, $f_{\vec{r}}$, however. Where vector information is present, the path direction is used to reduce it in an appropriate fashion to scalar quantities.

So far, we have defined what we mean by paths and can associate with each path a quantitative measure of quality or metric. This metric is a function of the joint probability of the path transition letters and the f-values of the random field along the path.

What is now needed is a systematic way of hypothesizing paths so that they may be compared via their corresponding metrics. As was discussed above, every path in the field cannot be hypothesized because the number of possibilities is enormous. Thus, maximum likelihood detection is impossible. What is done is make hypotheses in such a way that only a small subset of possible paths is actually explored, but this subset contains an actual edge path with high probability.

The procedure used is called sequential tree searching and is borrowed from coding theory, it presumes that a start or root node is given. This start node must be on an intensity edge but is otherwise arbitrary. The root node defines a tree of semi-infinite paths in the random field. Because of the special structure of paths, there are precisely $3^n$ paths of length n (or to depth n in the tree) beginning at the root node. The sequential searching algorithm begins at the root node and sequentialy examines paths in the tree. The exact procedure by which this is done depends on the algorithm used; these will be discussed in detail shortly. The sequential behavior, however, is common to them all. At each iteration of the algorithm, one of the paths explored so far is extended by one node and the metric for this new path is calculated. Decisions are made based on these metrics as to which path should be extended on the next iteration. This is in accord with the definition of sequential tree searching as defined by Forney, "Convolution Codes III: Sequential Decoding," *Inf. Control.*, vol. 25, pp. 267–297, July 1974: a search is sequential only if each new path hypothesized is an extension of a previously examined one and the decision as to which path to extend is based only on the set of paths visited thus far.

Because long paths are built up node by node, it is entirely possible that the algorithm can mistakenly follow a non-edge path of some depth into the tree. As discussed above, however, the average tendency of the metric under these circumstances is to decrease with increasing length. Our hope, therefore, is that these forays along incorrect paths will eventually be halted by the resulting decreases in metric. The algorithm at some point settles back onto the correct (edge) path for which the average tendency is for the metric to increase with length. Of course, this average behavior of the metric does not guarantee that all incorrect paths will eventually be abandoned.

Originally proposed independently by K. Zigangirov, "Some Sequential Decoding Procedures," *Prob. Peredachi Inf.*, vol. 2, pp. 13–25, 1966, the Z-J or stack algorithm is a very efficient method of performing sequential searching in a tree, especially when the implementation is in software. It is also the easiest of the sequential algorithms to understand and so provides the most accessible route to gaining insight into how sequential searching works.

At the heart of the Z-J algorithm is a stack or priority queue. Each entry in the stack consists of a path and its corresponding metric. These entries are ordered by their metric, with the "top" of the stack occupied by the path with the largest metric.

When the algorithm is first invoked, the stack is initialized by placing the root node at the top of the stack and assigning it a metric of 0. At this point a slight deviation from the classical Z-J algorithm must be accommodated due to the random field model on which paths are based. This modification is to specify a root direction as well. This direction information may be obtained directly from the gradient direction map or from a local computation on the f-field values.

Having specified a root node and direction, exactly three paths to depth 1 in the tree are defined. These are the three descendents of the root node. The first iteration of the stack algorithm proceeds as follows. The root node is deleted from the stack, the three descendents to depth 1 are placed onto the stack and ordered by their corresponding metrics. Subsequent iterations are performed by deleting the top-most path from the stack, finding its three descendant paths, calculating their metrics, and inserting them onto the stack according to their metrics. Thus at each iteration, the current best path is extended by one node. The current best path can be any path examined thus far since the largest metric always percolates to the top of the stack regardless of when it was last extended.

The algorithm brings out several important characteristics of all sequential searching algorithms. Perhaps most importantly from an operational standpoint, the amount of computation is not fixed or a simple function of path length. When the noise becomes more and more severe, the algorithm investigates more false paths and to larger depths in the tree before abandoning them. When the signal-to-noise ratio is high, the true edge path consistently has the best metric and so very little computational effort is spent on incorrect paths. This variable computational effort is typical of sequential searching algorithms. This is because data buffer overflows resulting from highly variable computational load under conditions of poor SNR are a major cause of output errors for sequential decoding. It is interesting to note that its application to image edge linking does not suffer from this particular problem. In effect, the data in its entirety is always available to the algorithm as the input field or fields (e.g. gradient magnitude and direction fields) are assumed to be given. The algorithm cannot therefore "fall behind" relative to constantly arriving data as in the coding/decoding situation. Of course, it is still true that additional delay must be accepted in these situations.

This algorithm clearly illustrates the characteristic that very long paths can be explored at the expense of not performing maximum likelihood decisions. Paths to depths, n, of hundreds of nodes in the tree can be readily examined by the algorithm but obviously not all to the $3^n$ possible paths are examined for such large n. The vast majority are never taken up by the algorithm because they exhibit such poor metrics in the first few nodes compared to the relatively few paths that are taken to great depths. It is conceivable that the correct path is among those that are discarded early, but can be shown that following an incorrect path to large n has a probability that decreases exponentially in n. Thus, sequential searching cannot guarantee selection of the most probable path among all possible paths (ML). It does, however, allow the most promising paths to be explored without expending computational effort on large numbers of unpromising paths.

One characteristic of the stack algorithm that is not shared by all sequential algorithms is its large memory requirement. Maintenance of the stack when exploring long paths requires the use of a significant amount of memory. The algorithm is thus suited to applications where the implementation is on software.

Three variations on the original Z-J algorithm have arisen in the coding literature. The first is the stack-bucket algorithm of Jelinek, "A Fast Sequential Decoding Algorithm Using a Stack," *IBM J. Res. and Dev.*, vol. 13, pp. 675–685, Nov., 1969. This is an attempt to partially alleviate a time consuming aspect of the stack algorithm. As the number of entries in the stack becomes large, it takes increasingly longer to insert successor paths into their appropriate place on the stack. With the stack-bucket algorithm, no ordering of the stack is performed at all. Instead, the stack is divided into a number of segments called buckets, with each bucket corresponding to an interval of possible metric values. With each iteration of the algorithm, paths are placed in the bucket appropriate to their metrics. No ordering in the buckets takes place. The path to be extended is simply taken from the top of the highest non-empty bucket. Note that this is not necessarily the best current path, but only a very good one, unless the highest non-empty bucket contains only this one path. On the other hand, the placement of paths onto the stack involves a computation that depends only on the number of buckets there are and does not grow as the stack increases in length. Thus, this algorithm trades away some performance for a substantial improvement in speed.

A second variation, introduced by Haccoun and Ferguson D. H. accoun and M. J. Ferguson, "Generalized Stack Algorithms for Decoding Convolutional Codes," *IEEE Trans. Inf. Theory*, vol. [T-21, pp. 638–651, Nov. 1975,] is called the generalized stack algorithm. In this case, paths are organized and extended just as in the Z-J algorithm but more than one path can be extended at the same time. This algorithm also can detect remerging paths. When two paths remerge, the path with lower metric is discarded from the stack, thus eliminating unwanted baggage. This modification seems to influence the buffer overflow problem of decoding. In view of its added complexity, its value in image edge linking is questionable.

The third variation is the multiple stack algorithm (P. R. Chevillat and D. J. Costello, Jr., "A Multiple Stack Algorithm for Erasure-free Decoding of Convolutional Codes," *IEEE Trans. Commun.*, Col. COM-25, pp. 1460–1470, Dec. 1977). This algorithm completely eliminates the buffer overflow problem by forcing the decoder ahead along "reasonably good" paths in times of much noise, rather than continuing the search for the best path. The manner in which this is done involves the judicious use of additional smaller stacks to which the algorithm turns when the main stack fills up. The smaller stacks limit the search space of the algorithm and thus speeds up its penetration of the tree. This technique may very well have application to the image problem.

The A* algorithm is a heuristic tree-searching algorithm originating in the artificial intelligence literature, N. Nilsson, *Problem-Solving Methods in Artifical Intelligence*, McGraw-Hill, 1971. In operation it differs little from the stack algorithm. The search is once again sequential with the best path extended as each iteration by a node. In this case, best is taken to mean that path with the lowest associated cost (an inverted metric). This cost is computed recursively by summing branch costs associated with each path transition from the start node to the current node. The algorithm includes a provision for eliminating inferior paths when remergings occur. The primary difference between A* and the Z-J algorithm is that the former also provides for the inclusion of a cost associated with completing the path from the current node to some specified goal node. This completion cost as well as the specification of the goal node must be provided by some a-priori or heuristic information source. It has been shown [Har68] that if this completion cost is a lower bound on the minimal cost path from the current node to the goal, then the algorithm will find an optimal, minimum cost path to the goal. If no such heuristic information is available, A* reduces essentially to the Z-J algorithm.

The Fano Algorithm, named after its originator, F. M. Fano, was actually the first algorithm to be developed for sequential searching, R. Fano, "A Heuristic Discussion of Probabilistic Decoding," *IEEE Trans. Inf. Theory*, vol. IT-9, pp. 64–74, April, 1963. This algorithm is particularly well suited for hardware implementations of sequential decoders as it requires very little memory. It is, however, more difficult to understand than the algorithms discussed above.

The Fano algorithm never makes large jumps about the tree as do the various stack algorithms. Instead, its movements are confined to three types: forward moves, from a given node to one of its successor nodes; backward moves from a successor to a predecessor node; and sideways from a successor node to another successor node of the same predecessor. Decisions as to which move to make at any particular time are based on comparisons between the path metric associated with the node under consideration and a running threshold, T. This running threshold is practically the only quantity that must be stored and always changes by multiples of some constant, $\Delta$.

When the algorithm is constantly moving forward, deeper into the tree, the threshold is increased by multiples of $\Delta$ such that $\Gamma \cdot \Delta < T \leq \Gamma$. Such forward moves are only allowed so long as $\Gamma \geq T$ for the new node. If none of the successor nodes satisfies this requirement, the algorithm executes a series of backward and sideways moves in an effort to find a new node such that $\Gamma \geq T$. If none can be found, the threshold is decremented by $\Delta$ and the search continues. The decision structure of the algorithm is so constructed that it is impossible for the algorithm to lodge itself in an infinite loop. Furthermore, the Fano algorithm practically always chooses the same path as does the stack algorithm.

The operation of the various algorithms described in the section above is critically dependent on the identification of a root node on each intensity edge of interest. The only requirement imposed on these root nodes is that they actually lie on the edge. The selection of these nodes is addressed below.

It seems reasonable to consider the output of the spatial gradient operator which precedes the SEL searching algorithm. The magnitude of the gradient is a measure of "edginess" at that point in the image. Therefore, nodes that exhibit a large gradient magnitude ought to be good candidates for root nodes. Questions to be asked are: (1) With what confidence do such nodes actually lie on an edge? (2) What is the probability that no root nodes for a given edge are generated in this way? and (3) How is a classification threshold on gradient magnitude values to be chosen?

Figure 2:
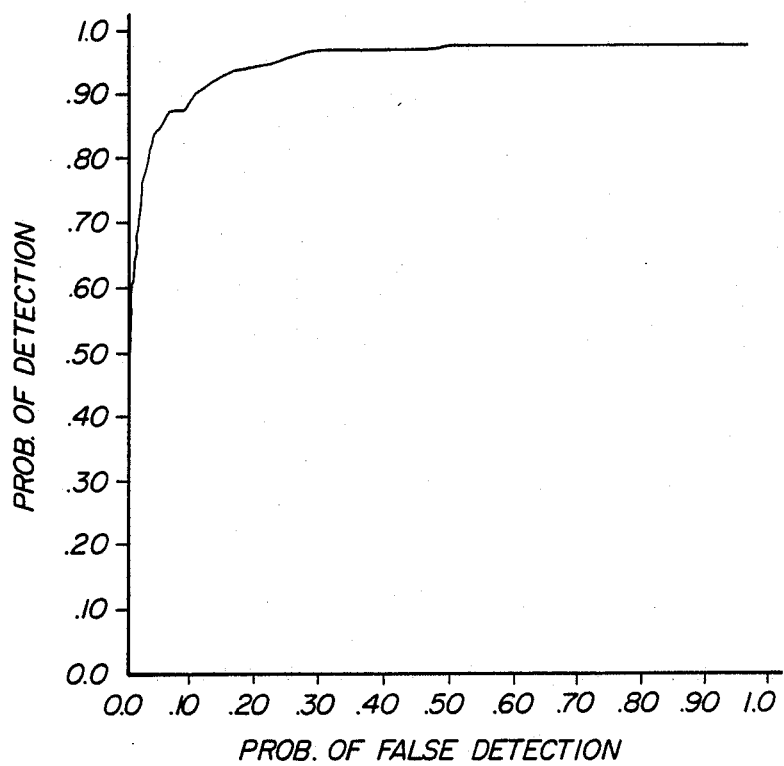
FIGS. 2 and 3 are graphs useful in explaining the present invention.

These questions may be addressed using the Receiver Operating Characteristic (ROC) curves for gradient operators. ROC curves, common in the detection theory literature, are parametric plots of the probability of detection (PD) versus the probability of false alarm (PF). Their use with linear edge operators for images is known. An example of such a curve is illustrated in FIG. 2. This curve is for a simple 3×3 Sobel gradient-type edge operator and a signal-to-noise ratio of 10 dB. The curve is parameterized by the decision threshold; as the threshold is raised, the locus of the operating point moves along the curve from the curve from the upper right hand corner to the lower left. The fact that the curve does not reach the upper left hand corner (PD=1, PF=0) is a manifestation of the imperfect performance of such operators: it is impossible to choose a threshold such that all the edge points are found and no non-edge points are misclassfied as belonging to an edge.

The closeness with which an operator's ROC curve comes to the (ideal) upper left corner is an indication of that operator's performance. Large support gradient opeartors may be expected to do considerably better than the Sobel operator of FIG. 2. Conversely, poorer SNR ratios tend to push the curve for any operator away from the upper left corner. It is a fundamental characteristic of all such curves, however, that they are convex and lie above the diagonal, PD=PF, known as the chance diagonal.

Returning to the problem of finding root nodes, we make the following important observation. In contrast to the classical detection problem for which operation at a high probability of detection is desired, the problem of selecting root nodes demands operation very near the lower left corner of the ROC curve. This observation is crucial to the starting node problem. If a high threshold on the gradient magnitude is employed (operation near the lower left corner of the ROC curve), then both the probability of detection and the probability of false alarm are small.

At any point along the ROC curve, the slope of the curve is equal to the likelihood ratio:

$$\text{slope} = l(f) = \frac{Pr(f \mid f \text{ is on an edge})}{Pr(f \mid f \text{ is not on an edge})} \quad (37)$$

An important proeprty of such curves is that this slope generally is quite large for large f, i.e. near the lower left corner. For example, if the conditional densities of Equation (37) are Gaussian, the likelihood ratio asymptotically approaches infinity. Thus, under quite general conditions it is reasonable to assume that the slope of the ROC curve is very high in the immediate vicinity of the origin. Imposing a high threshold on the gradient magnitude therefore implies that any magnitude value exceeding this threshold has a much higher probability of lying on an edge than not. The price paid for this high likelihood ratio is that the PD is small in the vicinity of the origin. That is, only a small fraction of the actual edge points will be identified by a high threshold. However, sequential searching techniques require only one starting node on an edge. A low PD is therefore not a drawback for SEL.

Figure 3:
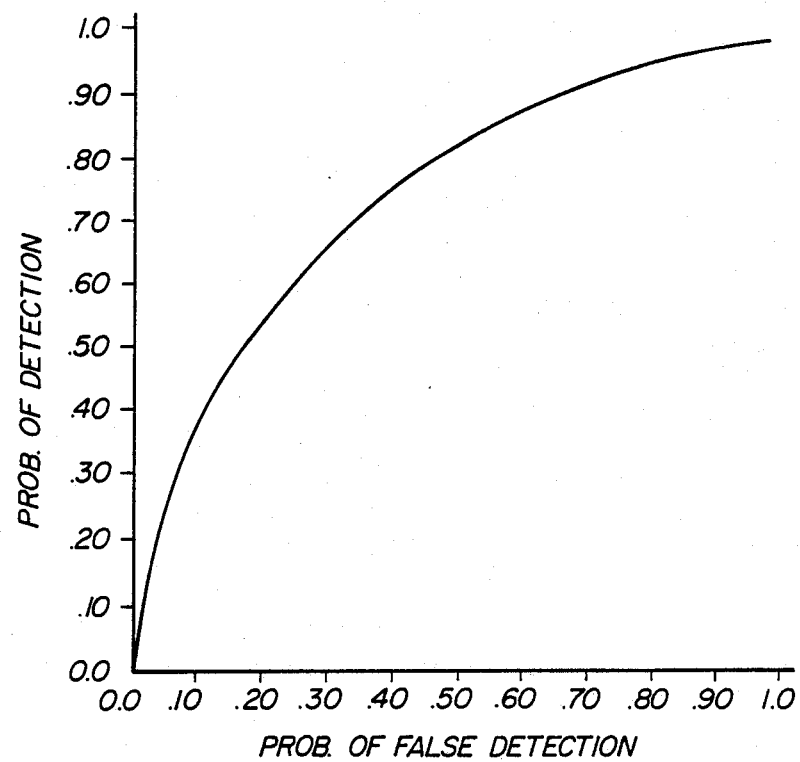

An example may serve to fix these ideas. Consider a gradient operator whose output in the presence of high noise power is characterized by the ROC curve of FIG. 3. This ROC curve results from the conditional probabilities:

$$Pr(f \mid H_1) = N(0.5, 1) \quad (38)$$

$$Pr(f \mid H_0) = N(-0.5, 1)$$

i.e. the conditional probabilities at the output of the operator are normal with a signal-to-noise of 1.0. This corresponds to exceedingly poor quality in the original image. At a threshold value of:

$$f_t = 3.2 \quad (39)$$

the likelihood ratio is:

$$\frac{Pr(f \mid H_1)}{Pr(f \mid H_0)} > 25 \quad (40)$$

and the PD is:

$$PD = erf(3.2 - 0.5) = 0.0035 \quad (41)$$

Thus, on average, only 1 in every 300 true edge points are identified by such a high threshold, but any point so identified is 25 times as likely to lie on an edge as not. The probability of false alarm is:

$$PF = erf(3.2 + 0.5) < 0.0001 \quad (42)$$

This example may be rather extreme; the output of large support Gaussian filtered gradient operators exhibit much higher SNR than this on many images of interest. However it serves to illustrate that, even under severe conditions, highly reliable start nodes may be generated by thresholding gradient magnitude values.

We have previously described a technique for finding candidate start nodes. For certain applications, where a-priori knowledge concerning the image under consideration is available, this technique can be augmented or even replaced by scene-specific methods that make use of that information. One such method is described in J. Modestino et al, "Computer Evaluation of Dynamic Left Ventricular Volume from Serial Angiograms," *Proc. Computers in Cardiology*, St. Louis, MO, pp. 211-218, Oct. 7-9, 1976, for the case of angiocardiograms. Since the image is known to contain the boundary of a heart for which a prototype outline has been supplied, that technique searches a restricted portion of the image for candidate start nodes that best fit the prototype model.

Depending on how much a-priori information is available, such scene-specific methods may employ any number of pattern recognition or template correlation techniques to search for areas in the image that have a high probability of lying on an edge of interest. These techniques may in fact provide even better rejection of false edge points; however, they are application specific. Their effectiveness is only as good as the scene model which they exploit. Where the image does not closely match the assumed model, their performance may degrade seriously. These techniques will not be treated in any depth here.

Strategies for terminating a sequential searching algorithm tend to be somewhat heuristic. Four such conditions suggest themselves for practical implementations. Others may perform well, especially where a-priori information is available.

Practical digitized images are of finite extent. Thus, intensity edges contained therein are of finite length. Several situations are possible. One, an edge may close on itself (e.g. a circle or the bounding contour of an object wholly contained in the image). In this case, the search may be terminated when the current best path closes on itself. Second, an edge may intersect another. Here again, search is terminated when the best path intersects another, previously found, edge path. Third, an edge may be continued off the support of the image. For this case, termination occurs when the search reaches the image boundary.

Another case is possible. Here an edge either stops abruptly without intersecting another or gradually fades in contrast to zero. These are the only really difficult situations for a sequential algorithm to handle. The approach suggested here is based on the running path metric. Since the algorithm will continue to search beyond the end of an abrupt edge, all such paths will exhibit a sharp fall off in metric beyond the end of the edge. Likewise, a strong intensity edge that begins to fade in contrast will be tracked for awhile by the algorithm, but the resulting path metric will fall from its previous high value before the fade. It is therefore reasonable to suggest a termination condition based on running metric. When the metric of the best path falls below some specified fraction of the highest metric along that path, the search is terminated. Of course, one runs the risk of terminating search just before the metric picks up again unless the fraction is fairly small. Abrupt edge ends are likely to be handled well by this technique, but slowly fading edges must always present a compromise to a sequential algorithm (and indeed to any other algorithm for that matter).

It will be appreciated that the detection of edges, lines, and other linear features in two dimensional discrete images may advantageously be applied to images developed or derived in any of a number of ways, including by means of X-ray techniques, nuclear magnetic resonance techniques, CAT scan techniques, conventional photographic techniques, video recording techniques, and the use of photodetector devices which directly transform light from an image into an electrical representation of the image.

The following source code listings illustrate implementation of the present invention by means of a digital computer. The C-language listing was written for a VAX 11/780 computer manufactured by Digital Equipment Corporation.

```
/*******************************************************************/
/*                                                                 */
/*      Paul Eichel                                                */
/*                                                                 */
/*      Program to find gradient magnitude and direction using a   */
/*         a Gaussian weighted gradient operator.  The magnitude   */
/*         map is left in a file called "mag" and the direction    */
/*         map is left in a file called "ang".                     */
/*                                                                 */
/*      Usage:   gaudif filename sigma gain [N]                    */
/*               where:   filename = name of image file            */
/*                        sigma = std. dev. of Gaussian lpf        */
/*                        gain = d.c. gain of operator             */
/*                        N = image size (default = 256)           */
/*                                                                 */
/*******************************************************************/ include <stdio.h>
include <math.h> define MSQ     66000
define M       256 unsigned char   image1[MSQ];
int             im1[MSQ],im2[MSQ];
int             N,NSQ,m;
unsigned char   outbuf[M],outbuf2[M];
int             filedes,filedes2;
char            b[50];
float           c[100],factor;
```

```c
main( argc, argv )
int     argc;
char *  argv[];
        {
        int     status,i;
        float   sigma,sigmas,den,tmpf;

/*
 *      parse command line
 */ sscanf(argv[1],"%s",b);
        sscanf(argv[2],"%f",&sigma);
        sscanf(argv[3],"%f",&factor);
        sscanf(argv[4],"%d",&N);
        if(N == 0) N = 256;
        printf("Standard Dev. = %f\n",sigma);
        printf("Gain = %f\n",factor);
        printf("N = %d\n",N);

/*
 *      read in image file
 */

NSQ = N*N;                      /* # of pixels in image */
        filedes = open(b,0);            /* open file */
        read(filedes,image1,NSQ);
        close(filedes);

/*
 *      find Gaussian filter coefficients
 */ sigmas = sigma * sigma;
        den = 3.14159;
        den = sqrt(2 * den * sigmas);
        m = 3.5 * sigma;
        for( i= (-m); i < (m+1); i++ )
                {
                tmpf = (i * i) / (2 * sigmas);
                tmpf = exp(-tmpf);
                c[i+m] = tmpf / den;
                }
        factor = factor / 100;

/*
 *      low pass filter
 */ gauss();

filedes = creat("mag",0600);
        filedes2 = creat("ang",0600);

/*
 *      take gradient
 */ dif();
        close(filedes);
        close(filedes2);
        exit(status);                   /* all done */
}
```

```
/*
 *       routine to perform Gaussian weighted low pass filter..
 *       this routine uses separability of Gaussian kernal.
 */ gauss()
        {
        int     i,row,col,v,*dest;
        unsigned char   *p;
        float   tmpf;

/*
 *      perform horizontal convolution
 */ for( row = 0; row < N; row++ )
            {
            v = row * N;
            dest = &im1[v];
            for( col = 0; col < N; col++ )
                {
                tmpf = 0;
                if(col >= m  && col < (N-m) )
                    {
                    p = &image1[v + col - m];
                    for(i=0; i< ((2*m)+1); i++) tmpf += c[i] * *p++;
                    tmpf = 100 * tmpf;
                    }
                *dest++ = tmpf;
                }
            }

/*
 *      perform vertical convolution
 */ for( col = 0; col < N; col++ )
            {
            if( col >= m && col < (N-m) )
                {
                for( row = 0; row < N; row++ )
                    {
                    tmpf = 0;
                    if(row >= m  && row < (N-m) )
                        {
                        v = ((row - m) * N) + col;
                        for(i=0; i< ((2*m)+1); i++)
                                tmpf += c[i] * im1[(i * N) + v];
                        }
                    im2[(row * N) + col] = tmpf;
                    }
                }
            }
        }

/*
 *      routine to perform gradient operation
 */ dif()
        {
        int     row,col,v;
```

```
            unsigned char   *dest,*dest2;
            int     *p1,*p2,*p3,*p4;
            float   sumx,sumy,tmpf;

for( row = 0; row < N; row++ ) {
                if( row > m && row < (N-m-1) ) {
                    v = (row * N) + m + 1;
                    p1 = &im2[v - N];
                    p2 = &im2[v - 1];
                    p3 = &im2[v + 1];
                    p4 = &im2[v + N];
                    dest = outbuf;
                    dest2 = outbuf2;
                    for(col = 0; col <= m; col++)
                            {*dest++ = 0; *dest2++ = 0;}
                    for( col = m+1; col < (N-m-1); col++ ) {
                            sumx = *p2++ - *p3++;
                            sumy = *p4++ - *p1++;
                            tmpf = (sumx * sumx) + (sumy * sumy);
                            tmpf = sqrt(tmpf);      /* gradient mag. */
                            tmpf = tmpf * factor;   /*mult. by gain factor*/
                            if(tmpf > 255) tmpf = 255;  /* overflow? */
                            *dest++ = tmpf;
                            tmpf = atan2(sumy,sumx);   /* grad. direction*/
                            *dest2++ = (tmpf + 3.1416) * 127 / 3.1416;
                    }
                    for(col = 0; col <= m; col++)
                            {*dest++ = 0; *dest2++ = 0;}
                }
                else {
                    dest = outbuf;
                    dest2 = outbuf2;
                    for(col=0; col<N; col++) { *dest++ = 0;   *dest2++ = 0;}
                }
                write(filedes,outbuf,N);
                write(filedes2,outbuf2,N);
            }
    }

/******************************************************************/
/*                                                                */
/*  Paul Eichel                                                   */
/*                                                                */
/*      Program to implement SEL algorithm without deanza.        */
/*      This program assumes the gradient magnitude map is        */
/*      in a file called "mag" and the gradient angle map         */
/*      is in a file called "ang". It will output the             */
/*      final edge map to a file called "edge".                   */
/*                                                                */
/*      Usage:  sel snr rho thres [N] [0,1]                       */
/*              where: snr = signal-to-noise ratio (~ 15-25)      */
/*                     rho = AR coefficient (~ 0.3-0.6)           */
/*                     thres = stop threshold on grad. mag.       */
/*                     N = image size (default = 256)             */
/*                     0,1 : 0 (default) = use markov trans.      */
/*                           1 = no markov trans. table           */
/*                                                                */
/******************************************************************/ include         <stdio.h>
include         <math.h>
```

```
#define N      256         /*maximum image size: 256x256*/
#define NSQ    65536
#define SL     2000        /* stack length */
define B      6 int    stx[SL],std[SL],stp[SL],std1[SL];
int    stend[SL],val[SL];
int    max,srti,new,count,M,MSQ;
float  stv[SL],ht1,stoph;
float  marprob[3][3][3];
float  prob[256];
unsigned char  magim[NSQ],*ptr1,edgeim[NSQ],angim[NSQ];

main( argc, argv )
int      argc;
char *   argv[];
        {
        float   tmpf,tmpf2,ht2,sigmas1,sigmas,ang1;
        float   rho,maxp;
        int     i,j,srtj,s,run,ok,dif[3],flagm[3],sl1;
        int     s1,s2,k,l,y,sel,loop1;
        int     st1,p0,p1,t1,t2,t3,t4,im1,im2,im3;
        int     fd1,fd3,fd4,nomar;
        int     map[8];
        int     map2[8];
        int     map3[8];
        FILE  *fd2,*fopen();

/*
 *      parse command line
 */ sscanf(argv[1],"%f",&sigmas);
        sscanf(argv[2],"%f",&rho);
        sscanf(argv[3],"%f",&stoph);
        sscanf(argv[4],"%d",&M);
        if(M == 0) M = 256;
        MSQ = M * M;
        sscanf(argv[5],"%d",&nomar);

printf("SNR = %4.1f\n",sigmas);
        printf("AR Coef. = %4.3f\n",rho);
        printf("N = %d\n",M);
        if(nomar == 1)  printf("No Markov Path Model\n");

/*
 *      calculate address maps:
 *              map: 8-connected neighbors.
 *              map2: map + p1/2.
 *              map3: map - p1/2.
 */ map[5] = -M-1;   map[4] = -M;    map[3] = -M+1;
        map[6] = -1;                     map[2] = 1;
        map[7] = M-1;    map[0] = M;     map[1] = M+1;
        map2[5] = M-1;   map2[4] = -1;   map2[3] = -M-1;
        map2[6] = M;                     map2[2] = -M;
        map2[7] = M+1;   map2[0] = 1;    map2[1] = -M+1;
        map3[5] = -M+1;  map3[4] = 1;    map3[3] = M+1;
        map3[6] = -M;                    map3[2] = M;
        map3[7] = -M-1;  map3[0] = -1;   map3[1] = M-1;
```

```c
/*
 *   open and read in gradient magnitude file.
 */ fd1 = open( "mag",0);
        if(fd1 < 0 )
                {
                printf("No mag file\n");
                exit(1);
                }
        read( fd1,magim,MSQ );
        close(fd1);

/*
 *   open and read in gradient angle file.
 */ fd3 = open( "ang",0);
        if(fd3 < 0 )
                {
                printf("No ang file\n");
                exit(1);
                }
        read( fd3,angim,MSQ );
        close(fd3);
        for(i=0; i<MSQ; i++) edgeim[i] = 0;

/*
 *   open and read in markov transition table file.
 */ if(nomar == 0)          /* if markov trans. table */
                fd2 = fopen( "markdat","r" );
        for(s1=0; s1<3; s1++)
           {
           for(s2=0; s2<3; s2++)
              {
              for(k=0; k<3; k++)
                 {
                 if(nomar == 1)   tmpf = 0.33;  /*if no markov table,
                                              all trans. = 1/3   */
                 else {
                       fscanf(fd2, "%d%d%d%f",&t1,&t2,&t3,&tmpf);
                       if(tmpf < .01) tmpf = .01;
                       }
                 marprob[s1][s2][k] = log(tmpf);
                 }
              }
           }
        if(nomar == 0)   fclose(fd2);
        tmpf = 5.0;                /* log of probability that edge */
        maxp = log(tmpf);          /* point is a local maximum */ fd4 = creat( "edge",0600);     /* output file */

/*
 *   main execution loop:  the following while loop will continue
 *       until the highest remaining root node has a grad. mag.
 *       less than the stop threshold.
 */ max = -1;
```

```
            run = -1;
            while( run != 0 )
            {
            run = -run;      /* run = 1: first search from a root node.
                                run = -1: second search from node */
            if(run == 1)
                {
                    k = -1;
                    while(k < 0)
                        {
                            newpt();          /* go get root node */
                            k = check(srti);            /* valid? */
                        }
                    j = ((angim[srti] + 16) / 32) % 8;   /* root direction */
                    srtj = j;
                    printf("Height = %4.1f\n",ht1);   /* root grad. mag. */
/*
 *  calculate log-likelihood ratio lookup table.
 */
                    sigmas1 = ht1 * ht1 / sigmas;
                    ht2 = sqrt(sigmas1);
                    for(y=0; y<256; y++)
                        {
                        tmpf = y - ht2;
                        tmpf2 = -(tmpf * tmpf) / (2 * sigmas1);
                        tmpf = y - ht1;
                        tmpf = -(tmpf * tmpf) / (2 * sigmas1);
                        tmpf2 += .08 * tmpf;
                        prob[y] = tmpf - tmpf2;
                        }
                }
            else    {
                    j = (srtj + 4) % 8;    /* root direction for
                                              second search */
                    } if(ht1 < stoph)           /* if grad. mag. of root node */
                {                     /* is < threshold, stop main loop */
                run = 0;
                break;
                }

/*
 *  stack algorithm search:  the following while loop is executed
 *     until the stack fills up or the search is terminated.
 */

/*
 *  initialize stack variables.
 */ stx[1] = srti;          /* root node location */
            std[1] = j;             /* root direction */
            stv[1] = 0;             /* root metric value */
            stv[0] = -1000;
            stp[1] = -1;            /* back pointer */
            stend[1] = 0;
            p0 = 1; p1 = 0; stl = 2;   /* p0 = top of stack pointer
                                          p1 = #2 stack pointer
                                          stl = end of stack pointer */ while(stl < SL - 10 )
```

```
{
    for(i=7; i<10; i++)              /* for 3 successor nodes: */
    {
        j = (i + std[p0]) % 8;       /* direction to successor */
        stx[stl] = stx[p0] + map[j]; /*address of successor */
        std[stl] = j;
        stp[stl] = p0;               /* pointer to predecessor */
        stend[stl] = stend[p0] + 1;
        im1 = stx[stl];
        angl = ((j*32) - angim[im1]) * 3.1416 / 127;  /* angle
                            between path direction and grad.
                            angle at successor */
        if(cos(angl) > 0.0) val[stl] = magim[im1];
        else val[stl] = - magim[im1];
        if(run == -1) val[stl] = -val[stl];
        dif[i-7] = val[stl];
        angl = angim[im1] / 32;
        k = angl;
        if((angl - k) > 0.5) k++;
        if(k == 8) k = 0;
        im2 = im1 + map2[k];         /* find right & left neighbors*/
        im3 = im1 + map3[k];
        if((magim[im1] > magim[im2]) &&
                (magim[im1] > magim[im3])) flagm[i-7] = 1;
                        /* is node a local maximum? */
        else flagm[i-7] = -1;
        stl++;
    }
    stend[p0] = -1;       /* node has successors on stack */

/*
 *   find path state at successor node.
 */
    if( p0 == 1 ) {s1=1; s2=1;}         /* initial state */
    else {
        t1 = std[p0];
        t2 = std[stp[p0]];
        s2 = ( t1 - t2 + 9 ) % 8;
        if( stp[p0] == 1 ) s1 = 1;
        else {
            t3 = std[stp[stp[p0]]];
            s1 = ( t2 -t3 + 9 ) % 8;
        }
    }

/*
 *   evaluate path metrics for 3 successor nodes
 */
    tmpf = (val[p0] - ht1) * rho;  /*Autoregressive error term*/
    stl -= 3;
    for(i=0; i<3; i++)
    {
        stv[stl] = stv[p0] + marprob[s1][s2][i];
        t3 = dif[i] - tmpf;
        if(t3 < 0) t3 = 0;
        stv[stl] += prob[t3];
        stv[stl] += flagm[i] * maxp;
        stl++;
    }

/*
 *   reorder stack. (actually only top 2 entries).
```

```
              t1=0; t2= -1000; t3= -1000; t4=0;
/*
 *    find best of 3 new nodes.
 */
              for(i=(stl-1); i>(stl-4); i--)
                  {
                  if(stv[i] > t2) {t2=stv[i]; t1=i;}
                  }
/*
 *    if best new node exceeds stack entry #2:
 */
              if(stv[t1] >= stv[p1])
                  {
                  p0 = t1;
                  for(i=(stl-1); i>(stl-4); i--)
                     {
                     if(i == t1) continue;
                     if(stv[i] > t3) {t3=stv[i]; t4=i;}
                     }
                  if(stv[t4] >= stv[p1])  p1 = t4;
                  }
/*
 *    otherwise make #2 the top stack entry.
 */
              else {
                  p0 = p1;  t2 = -1000;
                  for(i=0; i<stl; i++)
                     {
                     if(i == p0)  continue;
                     if(stend[i] < 0) continue;
                     if(stv[i] > t2) {t2 = stv[i];  p1 = i;}
                     }
                  }

/*
 *    terminate search?
 */
              i = stx[p0];
              if(i % M == 0) break;        /* if vertical edge of image*/
              if(i < 3*M) break;           /* if horiz. edge of image */
              if(i > MSQ - (3*M)) break;
              if(edgeim[i] > 240) break;   /* if intersect another path*/
              if(std[p0] % 2 == 1) i += map[(std[p0]+1) % 8];
              if(edgeim[i] > 240 ) break;
              } printf("Metric = %f\n",stv[p0]); /* metric of top path */

/*
 *    check to see if detected path crosses itself.
 */
         i = 1;
         p1 = p0;
         if( run == 1 )
             {
             sel = 1;
             loopl = 0;
             while( p1 > 0)
                 {
```

```
                std1[i++] = stx[p1];
                p1 = stp[p1];
                }
            s11 = i - 1;
            for( j = s11; j > 0; j-- )
                {
                if( edgeim[std1[j]] > 240 ) break;
                edgeim[std1[j]] = 255;
                }
/*
 *      if so:
 */
            if( j > 1 )
                {
                sel = j;
                for( k = s11; k > sel; k-- )
                    {
                    if( std1[k] == std1[sel] ) break;
                    }
                if( (k > sel + 1) && (k > s11 - 30) )
                    {
                    for( j = s11; j > k; j-- ) edgeim[std1[j]] = 0;
                    s11 = k;
                    loop1 = 1;
                    }
                }
            }
        else
            {
            while( p1 > 0)
                {
                std[i++] = stx[p1];
                p1 = stp[p1];
                }
            for(j = i-2; j > 0; j--)
                {
                if( edgeim[std[j]] > 240 ) break;
                edgeim[std[j]] = 255;
                }
            if( j > 1 )
                {
                for( k = sel; k < s11; k++ )
                    {
                    if( std1[k] == std[j] ) break;
                    }
                if( k < s11 - 1 )
                    {
                    if( loop1 == 1 )
                        {
                        for( k = j+1; k < i-1; k++ ) edgeim[std[k]] = 0;
                        }
                    else
                        {
                        for( j = k-1; j >= sel; j-- )
                                edgeim[std1[j]] = 0;
                        }
                    }
                }
            }
        }
    }
```

```
/*
 *    searching terminated:  write out edge map.
 */ write( fd4, edgeim, MSQ );
}                                    /* all done */

/*
 *    routine to find new root nodes.
 */ newpt()
{
int   i,j,addm,stbuf[5000];

/*
 *    if first root node, find max over whole image.
 */ if(max < 0)
        {
        max = 1;
        ptr1 = magim;
        for(i=0; i<MSQ; i++)
                {
                if(*ptr1 > max )
                        {max = *ptr1; addm = i;}
                ptr1++;
                }
        ht1 = 0.95 * max;
        srt1 = addm;
        new = 0;
        }

/*
 *    otherwise, compile list of potential root nodes in brackets
 *    of 5 in gradient magnitude.
 */
else    {
        while(new == 0)
                {
                max -= 5;
                ptr1 = magim;
                for(i=0; i<MSQ; i++)
                        {
                        j = *ptr1++;
                        if(( j < (max + 5)) && (j >= max))
                            stbuf[++new] = i;
                        }
                }
        srt1 = stbuf[new--];
        ht1 = 0.95 * max;
        }
}

/*
 *    this routine checks potential root nodes to see if they
 *    are ok:  not nearer to any detected edge or the edge of
 *    the image than B pixels
 */
```

```
check(1)
        int 1;
{
int    j,addr[165],k;

k = 0;
for(j= -B; j <= B; j++)
        {
        addr[k++] = 1 - (B * M) + j;
        addr[k++] = 1 + (B * M) + j;
        addr[k++] = 1 + (j * M) - B;
        addr[k++] = 1 + (j * M) + B;
        addr[k++] = 1 + j;
        }
j = 1;
for(k = 0; k < ((10*B) + 5); k++)
        {
        if(addr[k] < (11 * M) || addr[k] > (MSQ-(11*M))) j = -1;
        else   if(addr[k] % M == 0) j = -1;
        else   if( edgeim[addr[k]] > 128 ) j = -1;
        }
return(j);
}
```

Other objects and advantages of the invention will be apparent from the following description, the accompanying drawings and the appended claims.

What is claimed is:

1. A method of detecting intensity edge paths in an image by machine, said image being produced by a technique which is selected from the group consisting of X-ray, CAT scan, nuclear magnetic resonance, photographic, video recording, and photodetection techniques, comprising the steps of:
   (a) determine gradient magnitude and direction of the image in an array of node points using a Gaussian weighted gradient operator,
   (b) find a root node having a high probability of being on an edge path by selecting a node having a high gradient magnitude,
   (c) calculate a path metric, $\Gamma(m^i, f^i)$, for each adjacent node to the root node which may be on the edge by calculating:

$$\Gamma(m,f) = \sum_{i=1}^{n} \left[ \ln \frac{p_1(f,i)}{p_0(f,i)} + \ln Pr(s_i|s_{i-1}) \right],$$

where $p_1(f,i)$ is the probability that the pixel value F at the location $\Gamma i$ arises from an edge, $p_0(f,i)$ is the probability that the pixel value F at the location $\Gamma i$ does not arise from an edge, and $Pr(s_i|s_{i-1})$ is the transition probability for a new transition based on the Markov process,
   (d) store the metrics for each such adjacent node.
   (e) using the adjacent node having the highest metric, calculate the metrics for other nodes adjacent thereto, and
   (f) repeat steps (d) and (e) until the edge path having the highest metric is determined.

2. The method of claim 1 further comprising the additional steps of finding additional root nodes and performing said steps (b)–(f) with respect thereto.

3. The method of claim 2 in which step (f) comprises the step of continuing until an edge path closes on itself, or crosses a previously determined edge path, or reaches the edge of the image.

4. The method of claim 1 in which said metric is a function of the gradient information and the topology of the path by which the node was reached.

* * * * *